US012615321B2

(12) United States Patent
Abell

(10) Patent No.: US 12,615,321 B2
(45) Date of Patent: Apr. 28, 2026

(54) DEVICE, SYSTEM, AND METHOD FOR EFFECTING COMMUNICATION BETWEEN A SENSOR AND A HOST SYSTEM

(71) Applicant: DRÄGERWERK AG & CO. KGAA, Lübeck (DE)

(72) Inventor: Joshua Abell, Beverly, MA (US)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 0 days.

(21) Appl. No.: 18/569,083

(22) PCT Filed: Jun. 30, 2022

(86) PCT No.: PCT/EP2022/068087
§ 371 (c)(1),
(2) Date: Dec. 11, 2023

(87) PCT Pub. No.: WO2023/275264
PCT Pub. Date: Jan. 5, 2023

(65) Prior Publication Data
US 2024/0283853 A1      Aug. 22, 2024

Related U.S. Application Data

(60) Provisional application No. 63/216,687, filed on Jun. 30, 2021.

(51) Int. Cl.
*H04L 69/18* (2022.01)
*H04L 67/12* (2022.01)
*H04L 69/24* (2022.01)

(52) U.S. Cl.
CPC .............. *H04L 69/18* (2013.01); *H04L 67/12* (2013.01); *H04L 69/24* (2013.01)

(58) Field of Classification Search
CPC .......... H04L 69/18; H04L 67/12; H04L 69/24
See application file for complete search history.

(56) References Cited

U.S. PATENT DOCUMENTS

| | | | |
|---|---|---|---|
| 2004/0003133 A1* | 1/2004 | Pradhan ................ | H04L 67/303 719/318 |
| 2007/0258395 A1* | 11/2007 | Jollota .................. | H04W 72/23 455/67.11 |
| 2018/0060270 A1* | 3/2018 | Schnell ............... | G06F 13/4022 |
| 2024/0187485 A1* | 6/2024 | Hirst ....................... | H04L 69/08 |

* cited by examiner

*Primary Examiner* — Nazia Naoreen
(74) *Attorney, Agent, or Firm* — Nolte Lackenbach Siegel

(57) ABSTRACT

A method for activating a communication protocol for communication between a patient data acquisition device for a sensor and a host system may include operatively coupling the patient data acquisition device and the host system via a communications interface, performing a protocol discovery operation to determine a communication protocol utilized by the host system, activating one of a plurality of communication protocols stored in the memory for communication with the host system upon a determination that the communication protocol is utilized by the host system, the one of the plurality of communication protocols being the communication protocol implemented by the host system, and communicating patient data via the patient data acquisition device to the host system using the one of the plurality of communication protocols, and devices and systems that execute this method.

17 Claims, 4 Drawing Sheets

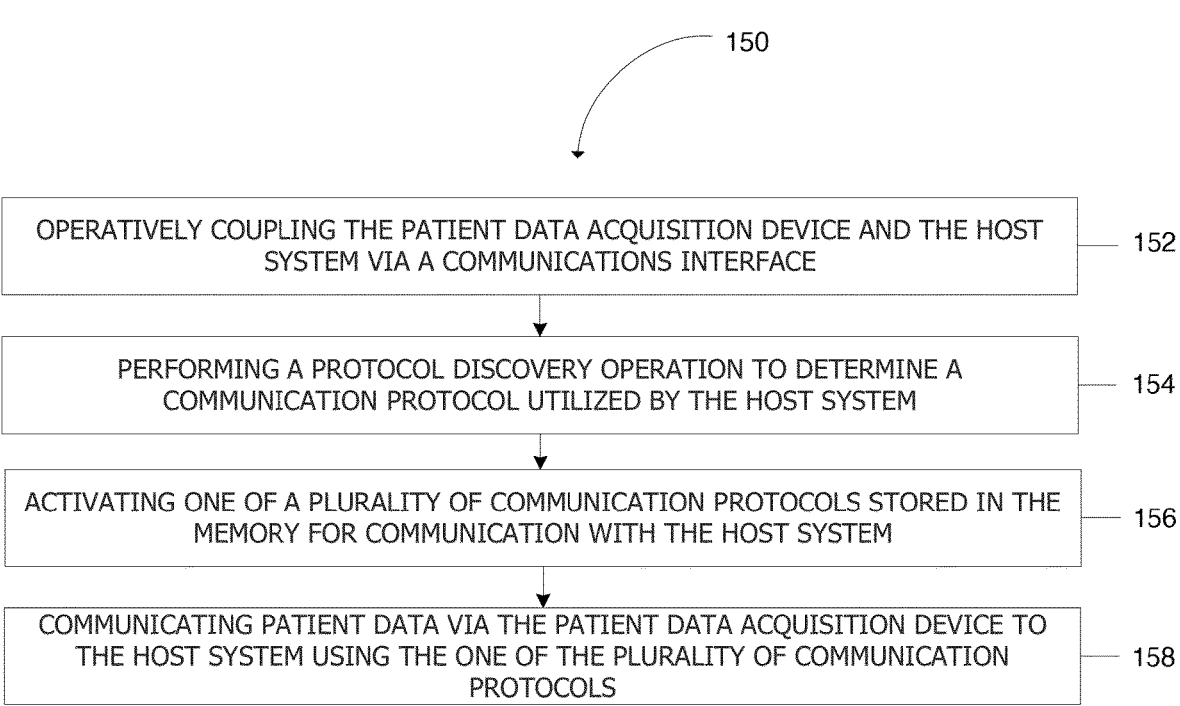

— 150

OPERATIVELY COUPLING THE PATIENT DATA ACQUISITION DEVICE AND THE HOST SYSTEM VIA A COMMUNICATIONS INTERFACE — 152

PERFORMING A PROTOCOL DISCOVERY OPERATION TO DETERMINE A COMMUNICATION PROTOCOL UTILIZED BY THE HOST SYSTEM — 154

ACTIVATING ONE OF A PLURALITY OF COMMUNICATION PROTOCOLS STORED IN THE MEMORY FOR COMMUNICATION WITH THE HOST SYSTEM — 156

COMMUNICATING PATIENT DATA VIA THE PATIENT DATA ACQUISITION DEVICE TO THE HOST SYSTEM USING THE ONE OF THE PLURALITY OF COMMUNICATION PROTOCOLS — 158

FIG. 5A

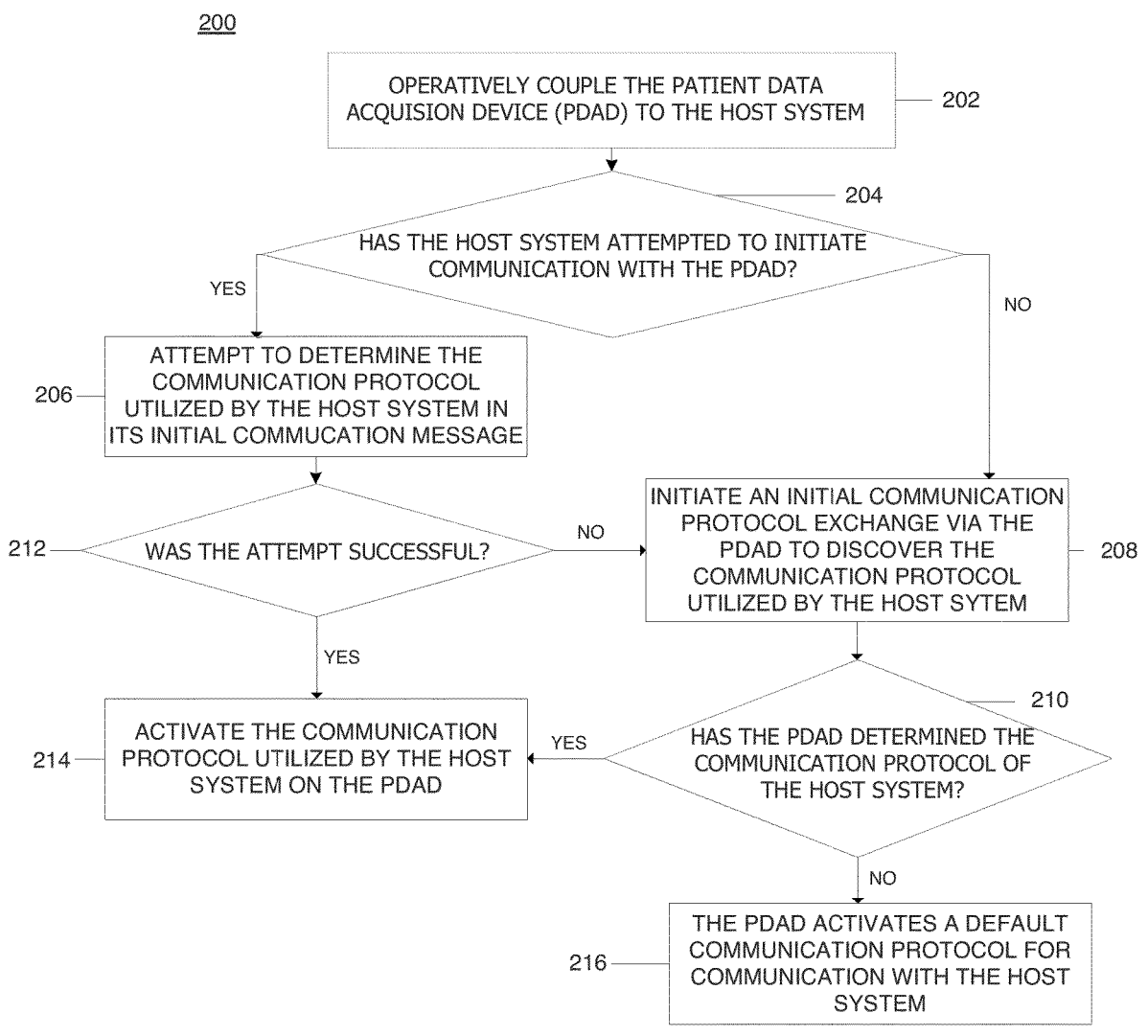

200

OPERATIVELY COUPLE THE PATIENT DATA ACQUISION DEVICE (PDAD) TO THE HOST SYSTEM — 202

— 204
HAS THE HOST SYSTEM ATTEMPTED TO INITIATE COMMUNICATION WITH THE PDAD?

YES          NO

206 — ATTEMPT TO DETERMINE THE COMMUNICATION PROTOCOL UTILIZED BY THE HOST SYSTEM IN ITS INITIAL COMMUCATION MESSAGE

INITIATE AN INITIAL COMMUNICATION PROTOCOL EXCHANGE VIA THE PDAD TO DISCOVER THE COMMUNICATION PROTOCOL UTILIZED BY THE HOST SYTEM — 208

212 — WAS THE ATTEMPT SUCCESSFUL?          NO

YES

214 — ACTIVATE THE COMMUNICATION PROTOCOL UTILIZED BY THE HOST SYSTEM ON THE PDAD          YES

— 210
HAS THE PDAD DETERMINED THE COMMUNICATION PROTOCOL OF THE HOST SYSTEM?

NO

216 — THE PDAD ACTIVATES A DEFAULT COMMUNICATION PROTOCOL FOR COMMUNICATION WITH THE HOST SYSTEM

FIG. 5B

DEVICE, SYSTEM, AND METHOD FOR EFFECTING COMMUNICATION BETWEEN A SENSOR AND A HOST SYSTEM

CROSS REFERENCE TO RELATED APPLICATION

This application is a national stage application of International Patent Application No. PCT/EP2022/068087, filed on Jun. 30, 2022, the disclosure of which is incorporated by reference herein in its entirety as part of the patent application and which further claims the priority of U.S. Application Ser. No. 63/216,687, filed on Jun. 30, 2021, the content of which is hereby incorporated by reference for all purposes, including the right for priority, as if set forth verbatim herein.

RELATED APPLICATIONS

This document claims the priority of U.S. Application Ser. No. 63/216,687, filed Jun. 30, 2021, the content of which is hereby incorporated by reference for all purposes, including the right for priority, as if set forth verbatim herein.

BACKGROUND

Technical Field

The present disclosure generally relates to a device, system, and method for effecting communication of patient data between a sensor and a host system.

Description of the Related Art

This section of this document introduces information about and/or from the art that may provide context for or be related to the subject matter described herein and/or claimed below. It provides background information to facilitate a better understanding of the various aspects of the that which is claimed below. This is a discussion of "related" art. That such art is related in no way implies that it is also "prior" art. The related art may or may not be prior art. The discussion in this section of this document is to be read in this light, and not as admissions of prior art.

A communication protocol includes rules for allowing at least separate computing devices to transmit information and/or data between such devices and governing the transmission of such information and data in a meaningful way. In a medical setting, a patient may have multiple sensors that are connected to the patient to monitor various attributes (e.g., blood pressure, temperature, heart rate, etc.) of the patient. The sensors typically are coupled to the same host system which may display the monitored attributes for the caregiver (e.g., the doctor, physician's assistant, or nurse) for the patient. Not only may each sensor utilize its own proprietary communication protocol and such protocols may change depending on the date of manufacture of the sensor, but the host system may also have its own proprietary communication protocol. For the sensors and the host system to communicate, they must do so in the same communication protocol. Thus, there is a continuing need for medical devices (e.g., sensors) that are configured to communicate with various host systems that have different communication protocols.

It should be understood that the background is provided to aid in an understanding of the present invention and that nothing in the background section shall be construed as an admission of prior art in relation to the inventions described herein.

SUMMARY

In an embodiment of the present disclosure, a patient data acquisition device for transmitting patient data to a host system may include: a sensor interface for connecting the patient data acquisition device to a sensor for monitoring patient data; a communications interface for connecting the patient data acquisition device to the host system; a control unit comprising: a processing resource; and a memory communicating with the processing resource and storing instructions that, when executed by the processing resource, cause the processing resource to: perform a protocol discovery operation to determine a communication protocol implemented by the host system; implement one of a plurality of communication protocols stored in the memory for communication with the host system upon a determination that the one of the plurality of communication protocols is the communication protocol implemented by the host system; and communicate patient data received via the sensor interface to the host system via the communications interface using the one of the plurality of communication protocols.

A system may be configured to be connected to a host system for monitoring patient data. The system may include a sensor interface for operatively coupling the sensor to a patient, and a patient data acquisition device as described above.

A method for activating a communication protocol for communication between a patient data acquisition device for a sensor and a host system may include: operatively coupling the patient data acquisition device and the host system via a communications interface; performing a protocol discovery operation to determine a communication protocol utilized by the host system; activating one of a plurality of communication protocols stored in the memory for communication with the host system upon a determination that the communication protocol is utilized by the host system, the one of the plurality of communication protocols being the communication protocol implemented by the host system; and communicating patient data via the patient acquisition device to the host system using the one of the plurality of communication protocols.

These and other aspects of the present disclosure are described in greater detail below with reference to the accompanying figures.

BRIEF DESCRIPTION OF THE DRAWINGS

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 5A is a flowchart illustrating a method according to an aspect of the present disclosure.

FIG. 5B is a flowchart illustrating another method according to an aspect of the present disclosure.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various embodiments and aspects of the present disclosure will be described with reference to the accompanying drawings. The following description and drawings are illustrative of the present disclosure and are not to be construed as limited the disclosure. Numerous specific details are described to provide a thorough understanding of various embodiments of the present disclosure. However, in certain circumstances, well-known or conventional details are not described in order to provide a concise discussion of embodiments of the present disclosure.

The present disclosure is best understood from the following detailed description when read with the accompanying figures. Some portions of the detailed description which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. Such signals may be referred to as bits, values, elements, symbols, characters, terms, numbers, or the like. Unless specifically stated otherwise as apparent from the following discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's memories or registers or other such information storage, transmission or display devices.

Figure 1:
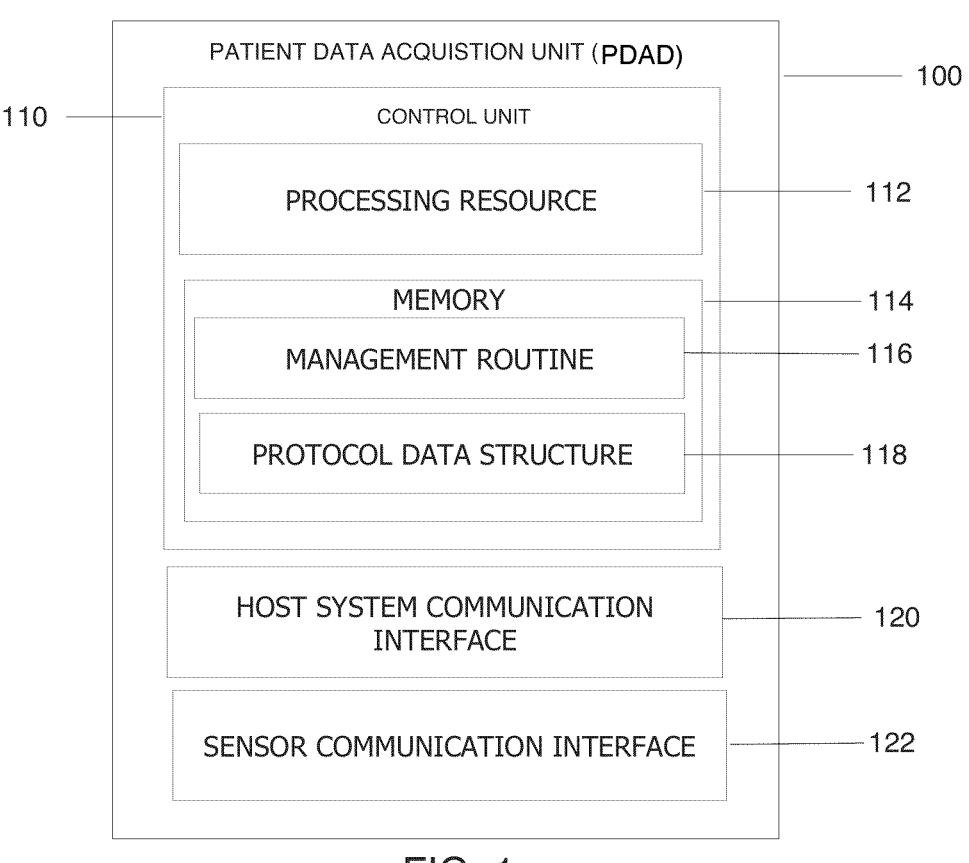
FIG. 1 is a block diagram of a Patient Data Acquisition Device ("PDAD") according to an aspect of the present disclosure.

Referring to FIG. 1, a PDAD 100 may include a control unit 110 that may include a processing resource 112 and a memory 114. The processing resource 112 may be a computer processing resource such as, for example, a microprocessor, an embedded processor, a Digital Signal Processor ("DSP"), a network processor, or other processor-based device executing computer code. In some embodiments, the processing resource may be an EEPROM or an Application Specific Integrated Circuit ("ASIC"). Still other embodiments may employ other kinds of processing resources.

The memory 114 may be Random Access Memory ("RAM"), ROM, or some combination of the two. The memory 114 may also be installed or removable. The memory 114 may include a management routine 116 and a protocol data structure 118, which may be, for example, a database, which may store a plurality of communication protocols. The control unit 110 may further include a host system communication interface 120 and a sensor communication interface 122. The host system communication interface 120 and the sensor communication interface may each be a communication interface to which a suitable communication cable may be coupled or via which communication between a medical device (e.g., sensor) and host system may be established. The communication interface 120 may be universal serial bus ("USB"), a serial communication bus (e.g., an RS232 connector including a connector pinout), and/or a wireless communication interface (e.g., BLUETOOTH®, IEEE 802.11 standards, WIFI®, etc.).

Figure 2:
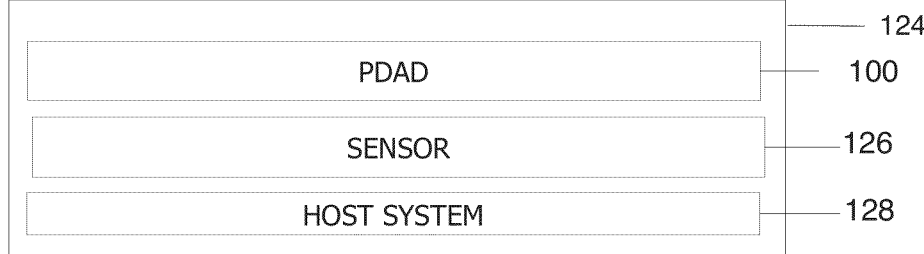
FIG. 2 is a block diagram of a system according to an aspect of the present disclosure.

As shown in FIG. 2, a sensor system 124 may include the PDAD 100, a sensor 126, and a host system 128. The PDAD 100 may serve to bridge the sensor 126 and the host system 128, thereby permitting data that is received via the sensor 126 to be relayed to the host system 128. The sensor 126 may be used to diagnose, monitor, and/or treat medical conditions or diseases. The sensor 126 may be any type of medical sensor for measuring patient data including, for example, blood pressure, oxygen saturation, heart rate, temperature, brain activity (e.g., electroencephalogram ("EEG")), and/or other patient data. The host system 128 may be any suitable monitoring system to which the sensor 126 is to relay data. The host system 128 may provide a display (not shown) to present the patient data received from the sensor 126 and may provide an interface that allows the user (e.g., caregiver) to view, manipulate, modify, and/or interact with the equipment (e.g., the sensor 126) and the patient data displayed on the display of the host system 128.

Figure 3:
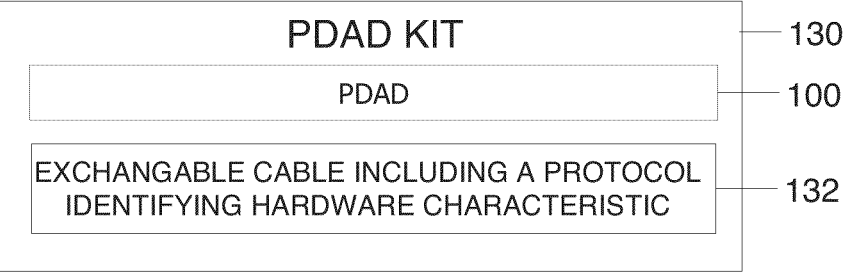
FIG. 3 is a block diagram of another system including the PDAD of FIG. 1.
Figure 4:
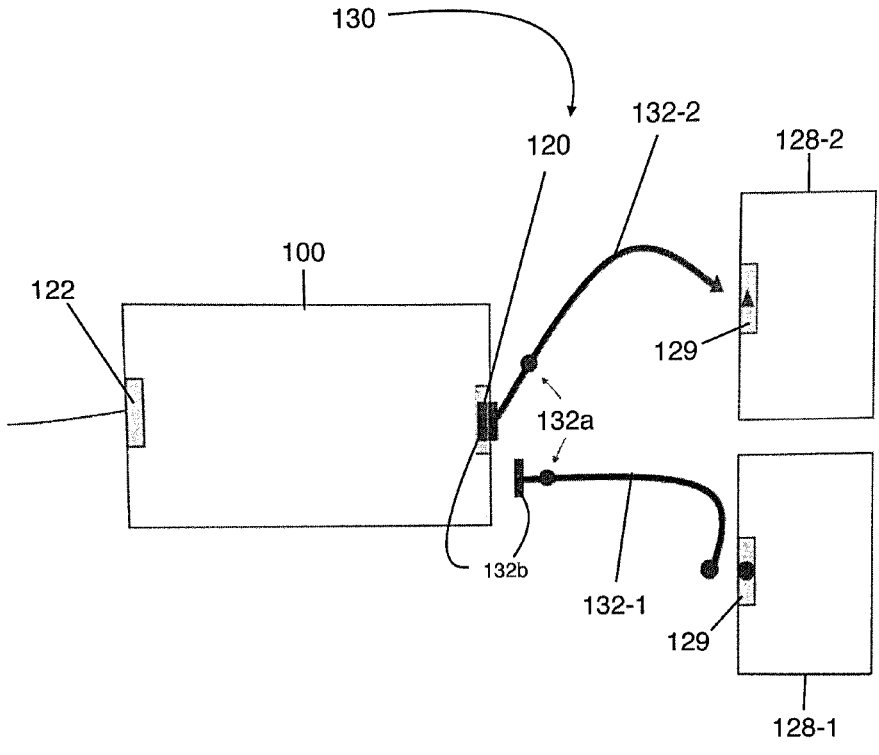
FIG. 4 is a schematic diagram illustrating coupling the PDAD with different host systems by an exchangeable cable that includes a protocol identifying hardware characteristic according to an aspect of the present disclosure.

The PDAD 100 may be a part of a PDAD kit 130, shown in FIG. 3. As shown in FIG. 3, a PDAD kit 130 may include the PDAD 100 and at least one exchangeable cable 132 including a protocol identifying hardware characteristic 132a. As shown in FIG. 4, the PDAD kit 130 may include the PDAD 100 and a first cable 132-1 and a second cable 132-2. Each of the first cable 132-1 and the second cable 132-2 may include a different hardware characteristic 132a that corresponds to a communication protocol associated with a respective one of the host systems 128-1, 128-2. The hardware characteristic 132a as used herein refers generally to a characteristic of the cable 132 that is identifiable by the PDAD 100.

For example, the hardware characteristic 132a may include an electrically erasable programmable read-only memory ("EEPROM") that is configured to transmit identifying data to the PDAD 100 or a resistive element with a specific resistance value of the cable that may be identified by the PDAD 100 such that when a particular cable 132 is coupled to the host system communication interface 120, shown in FIG. 1, of the PDAD 100, the PDAD 100 selects a predetermined communication protocol that is associated with that particular cable 132. With respect to the resistive element, the cable 132 may include a resistive element and the PDAD 100 may measure the resistance value. For example, the PDAD 100 may include a voltage detection element (not shown) and when the voltage is detected to be at a particular value or range of values the resistance value may be determined by the PDAD 100 when the current through the cable is known by applying Ohm's law which defines voltage as the product of the current and resistance between two points. Other means of determining the value of the resistance would be apparent to those of ordinary skill in the art and such means would be within the scope and spirit of the present disclosure. Alternatively, or additionally, a connection end 132*b* may have a specific pin configuration that is detectable by the PDAD 100 and that pin configuration is associated with a particular communication protocol.

In other words, the cable 132-1 has identifiable physical hardware characteristics that are associated with the communication protocol that is utilized by the host system 128, and the cable 132-2 has identifiable physical hardware characteristics that are associated with the communication protocol that is utilized by the host system 128-2. Once the characteristics of the cable 132 are determined when the cable is coupled to the PDAD 100, the PDAD 100 may activate a predetermined communication protocol that is associated with that particular cable 132.

Also, as shown in FIG. 3, the host systems 128-1 and 128-2 may include respective interfaces 129 to which the cable 132 (e.g., cable 132-1 or 132-2) may be operatively coupled. The PDAD 100 may also include an interface 122 to which the sensor 126 may be operatively coupled. It should be understood that although the PDAD 100 is shown and described as being a separate device from the sensor 126 that in other embodiments not shown, the PDAD 100 and the sensor 126 may be provided as a singular device and have a predetermined communication protocol through which patient data collected from the sensor 126 is communicated to the PDAD 100.

Conventionally, coupling a sensor to a host system is complicated because there is not a single standardized communication protocol that is utilized by sensors and host systems. This may be because older equipment may utilize different communication protocols than newer equipment and/or because different manufacturers may utilize different default or preferred communication protocols. Advantageously, the present disclosure provides a PDAD 100 that is configured to be electrically and communicatively coupled to various equipment (i.e., the sensor 126 and the host system 128).

A method 150 and a method 200 of operatively coupling the PDAD 100 to the host system 128 are now described with respect to FIGS. 5A-5B. The method 200 may be included in the management routines 116 for selecting one of the communication protocols that are stored in the protocol data structure 118. In other words, the method 200 may include the instructions that are executed by the processing resource 112 of the control unit 110.

Referring to FIG. 5A, a method 150 of establishing communication between the PDAD and the host system may include, a step 152 of operatively coupling the patient data acquisition device and the host system via a communications interface, a step 154 of performing a protocol discovery operation to determine the communication protocol that is utilized by the host system, a step 156 of activating one of a plurality of communication protocols stored in the memory for communication with the host system, and a step 158 of communicating patient data via the PDAD 100 to the host system 128 using one of the plurality of communication protocols. Referring back to FIG. 4, the step 154 of performing the discovery protocol operation may include coupling a specific communication that includes a characteristic that is identifiable by the PDAD 100.

The protocol discovery operation at step 154 may include offering a USB class to the host system 128. In some implementations, the offering of the USB class to the host system 128 may cause the host system to identify the USB class and to select a corresponding protocol for communication with the PDAD 100. The offering of the USB class to the host system to trigger a response from the host system; and the activation of the one of the plurality of communication protocols may include selecting the first communication protocol from the plurality of communication protocols in response to receiving the response from the host system, the response being a communication from the host system 128 in the first communication protocol after the USB has offered the USB class to the host system 128. In some implementations, the communication protocol may be wireless, and the host system 128 may attempt to discover the PDAD 100, for example, by sending a communication to the PDAD 100 which the PDAD 100 may utilize to select the communication protocol for communication with the host system 128.

Referring now collectively to FIG. 2 and FIG. 5B, the method 200 may include a step 202 of operatively coupling the PDAD 100 to the host system 128. At step 204, a query may be performed as to whether the host system 128 has attempted to initiate communication with the PDAD 100. If the host system 128 has attempted to initiate communication with the PDAD 100, the method 200 proceeds to step 206 to attempt to determine the communication protocol that was utilized by the host system 128 in its initial communication message with the PDAD 100. At step 212, there is a query as to whether the attempt to determine the communication protocol of the initial communication message was successful. In other words, the PDAD 100 recognizes a communication attempt by the host system 128. However, if the determination is not made within a predetermined time, failure to determine the communication protocol may be presumed. If the determination of the communication protocol is successful, at step 214, the PDAD 100 activates the communication protocol utilized by the host system 128.

Alternatively, if the attempt to determine the communication protocol utilized by the host system 128 was not successful, the PDAD 100 may proceed to step 208. Also, if at step 204, the host system 128 had not attempted to initiate communication with the PDAD 100, the method 200 proceeds to step 208 in which the PDAD 100 initiates an initial communication protocol exchange via the PDAD 100 to discover the communication protocol utilized by the host system 128. Step 208 may include a discovery process that may include attempting a plurality of different communication protocols that are stored in the protocol data structure 118 until a successful communication between the PDAD 100 and the host system 128 occurs. Step 210 is a query as to whether the PDAD 100 has determined the communication protocol utilized by the host system 128 such that communication between the host system 128 and the PDAD 100 has been successfully established. If, however, the communication protocol of the host system 128 was not determined, the PDAD 100 may activate a default predetermined communication protocol at step 216. The determination of the communication protocol of the host system 128 may be determined upon a successful receipt of a communication by the PDAD 100 from the host system 128, which occurs once the PDAD 100 activates a communication protocol that is the same as that of the host system 128.

Advantageously, the PDAD 100 is configured to reconfigure itself to communicate in the communication protocol of the host system 128 in response to determining the communication protocol from the initial communication from the host system or via a discovery process until communication is established. The PDAD 100 therefore is configured to bridge the communication between a sensor 126 and the host system 128 which might otherwise be unable to communicate.

While the present disclosure may have been shown and described with reference to various embodiments thereof, it will be understood by those skilled in the art that various changes in form and details may be made therein without departing from the spirit and scope of the present disclosure as defined by the appended claims and their equivalents. In other words, the various exemplary embodiments disclosed in the present specification and drawings are merely specific embodiments to facilitate an understanding of the various aspects of the present disclosure and are not intended to limit the scope of the present disclosure. For example, the particular ordering of steps may be modified or changed without departing from the scope and spirit of the present disclosure. Therefore, the scope of the present disclosure is defined not by the detailed description of the disclosure but by the appended claims, and all differences within the scope should be construed as being included in the present disclosure.

What is claimed is:

1. A patient data acquisition device for transmitting patient data to a host system, the patient data acquisition device comprising:
    a sensor interface for connecting the patient data acquisition device to a sensor for monitoring patient data;
    a communications interface for connecting the patient data acquisition device to the host system, the communications interface including a cable interface; and
    a control unit comprising:
        a processing resource; and
        a memory communicating with the processing resource and storing instructions that, when executed by the processing resource, cause the processing resource to:
            perform a protocol discovery operation to determine a communication protocol utilized by the host system, including identifying a hardware characteristic of a cable coupled with the cable interface over which the host system and the patient data acquisition device communicate, the hardware characteristic including an EEPROM embedded in the cable;
            activate one of a plurality of communication protocols stored in the memory for communication with the host system upon a determination that the one of the plurality of communication protocols is the communication protocol utilized by the host system, wherein:
                the plurality of communication protocols includes a default communication protocol, the default communication protocol being a wired communication protocol; and
                activating the one of the plurality of communication protocols further comprises utilizing the default communication protocol for communication with the host system upon satisfaction of a condition; and
            communicate patient data received via the sensor interface to the host system via the communications interface using the one of the plurality of communication protocols.

2. The patient data acquisition device of claim 1, wherein the hardware characteristic further includes a pin configuration of the cable, a resistance value of the cable, or combinations thereof.

3. The patient data acquisition device of claim 1, wherein the condition is the host system failing to communicate with the patient acquisition device in the first communication protocol within a predetermined time.

4. The patient data acquisition device of claim 1, wherein the communications interface includes a wireless communications interface.

5. A sensor system configured to be connected to a host system for monitoring patient data, comprising:
    a sensor;
    a sensor interface for operatively coupling the sensor to a patient; and
    a patient data acquisition device comprising:
        a patient data interface connecting the sensor to the patient data acquisition device;
        a communications interface for connecting the patient data acquisition device to the host system, the communications interface including a cable interface; and
        a control unit comprising:
            a processing resource; and
            a memory storing a plurality of communication protocols, the memory communicating with the processing resource and storing instructions that, when executed by the processing resource, cause the processing resource to:
                perform a protocol discovery operation to determine a communication protocol utilized by the host system, including identifying a hardware characteristic of a cable coupled with the cable interface over which the host system and the patient data acquisition device communicate, the hardware characteristic including an EEPROM embedded in the cable;
                activate one of the plurality of communication protocols, the one of the plurality of communication protocols being the first communication protocol upon a determination that the first communication protocol is included in the plurality of communication protocols, wherein the plurality of communication protocols includes a default communication protocol, the default communication protocol being a wired communication protocol; and
                communicate the patient data to the host system using the first communication protocol.

6. The sensor system of claim 5, wherein the first communication protocol is a wireless communication protocol.

7. The sensor system of claim 5, wherein the hardware characteristic further includes a pin configuration of the cable, a resistance value of the cable, or combinations thereof.

8. The sensor system of claim 6, wherein:
    the communications interface comprises a USB; and
    the determination that the first communication protocol is utilized by the host system comprises offering a USB class to the host system to trigger a response from the host system; and
    the activation of the one of the plurality of communication protocols comprises selecting the first communication protocol from the plurality of communication protocols in response to receiving the response from the host system, the response being a communication from the host system in the first communication protocol after the USB has offered the USB class to the host system.

9. The sensor system of claim 8, wherein the activation of the one of the plurality of communication protocols further comprises defaulting to the default communication protocol for communication with the host system upon satisfaction of a condition.

10. The sensor system of claim 9, wherein the condition is passage of a predetermined amount of time in which the host system has failed to communicate with the patient data acquisition device in the first communication protocol.

11. A method for activating a communication protocol for communication between a patient data acquisition device for a sensor and a host system, comprising:

operatively coupling the patient data acquisition device and the host system via a communications interface, the communications interface including a cable interface;

performing a protocol discovery operation to determine a communication protocol utilized by the host system, including identifying a hardware characteristic of a cable coupled with the cable interface over which the host system and the patient data acquisition device communicate, the hardware characteristic including an EEPROM embedded in the cable;

activating one of a plurality of communication protocols, the plurality of communication protocols including a default communication protocol and the default communication protocol being a wired communication protocol, stored in the memory for communication with the host system upon a determination that the communication protocol is utilized by the host system, the one of the plurality of communication protocols being the communication protocol implemented by the host system; and communicating patient data via the patient data acquisition device to the host system using the one of the plurality of communication protocols.

12. The method of claim 11, wherein:

the communications interface comprises a USB;

the memory communicating with the processing resource and storing instructions that, when executed by the processing resource, is further configured to cause the processing resource to:

offer a USB class to the host system to trigger a response from the host system; and determine the communication protocol utilized by the host system; and activating the communication protocol for communication with the host system comprises selecting the first communication protocol from the plurality of communication protocols in response to receiving the response from the host system, the response being a communication from the host system in the first communication protocol after the USB has offered the USB class to the host system.

13. The method of claim 12, wherein the first communication protocol is a wireless communication protocol.

14. The method of claim 12, wherein implementing the communication protocol for communication with the host system further comprises defaulting to the default communication protocol for communication with the host system in response satisfaction of a condition.

15. The method of claim 14, wherein the condition is a failure of establishing communication between the host system and the patient data acquisition device within the predetermined time.

16. The method of claim 11, wherein:

the communications interface comprises a physical interface for electrically coupling a cable between the host system and the patient data acquisition device.

17. The method of claim 16, wherein the hardware characteristic of the cable further comprises a pin arrangement of the cable, a resistance value of the cable, or combinations thereof.

\* \* \* \* \*